United States Patent [19]

Désormiére et al.

[11] 4,103,988
[45] Aug. 1, 1978

[54] ELECTRICALLY CONTROLLED OPTICAL SWITCH

[75] Inventors: Bernard Désormiére; Erich Spitz, both of Paris, France

[73] Assignee: Thomson-CSF, Paris, France

[21] Appl. No.: 684,383

[22] Filed: May 7, 1976

[30] Foreign Application Priority Data

May 13, 1975 [FR] France .................. 75 14873

[51] Int. Cl.² ............................................ G02B 5/18
[52] U.S. Cl. ........................... 350/162 R; 350/151; 350/355
[58] Field of Search ............. 350/162 R, 151, 160 R; 179/158 R

[56] References Cited

U.S. PATENT DOCUMENTS

| 3,492,061 | 1/1970 | Dillon et al. | 350/162 R X |
| 3,508,215 | 4/1970 | Cohler et al. | 350/162 R X |
| 3,752,563 | 8/1973 | Torok et al. | 350/162 R X |
| 3,870,397 | 3/1975 | Dillon et al. | 350/151 X |

OTHER PUBLICATIONS

Spain et al., "Stripe Domains in Thin Magnetic Films . . ." *Journal of Applied Physics*, vol. 37, No. 3, Mar. 1, 1966, pp. 953-959.

*Primary Examiner*—John K. Corbin
*Assistant Examiner*—John D. Lee
*Attorney, Agent, or Firm*—Cushman, Darby & Cushman

[57] ABSTRACT

The invention relates to switches which enable connections to be optically established between at least one incoming electrical circuit and one of several outgoing electrical circuits. It comprises associating at least one electrical light source, a thin magnetic layer forming a diffraction network and photoelectric receivers, the thin layer enabling the light beam issuing from the source to be directed onto the receivers selected.

5 Claims, 2 Drawing Figures

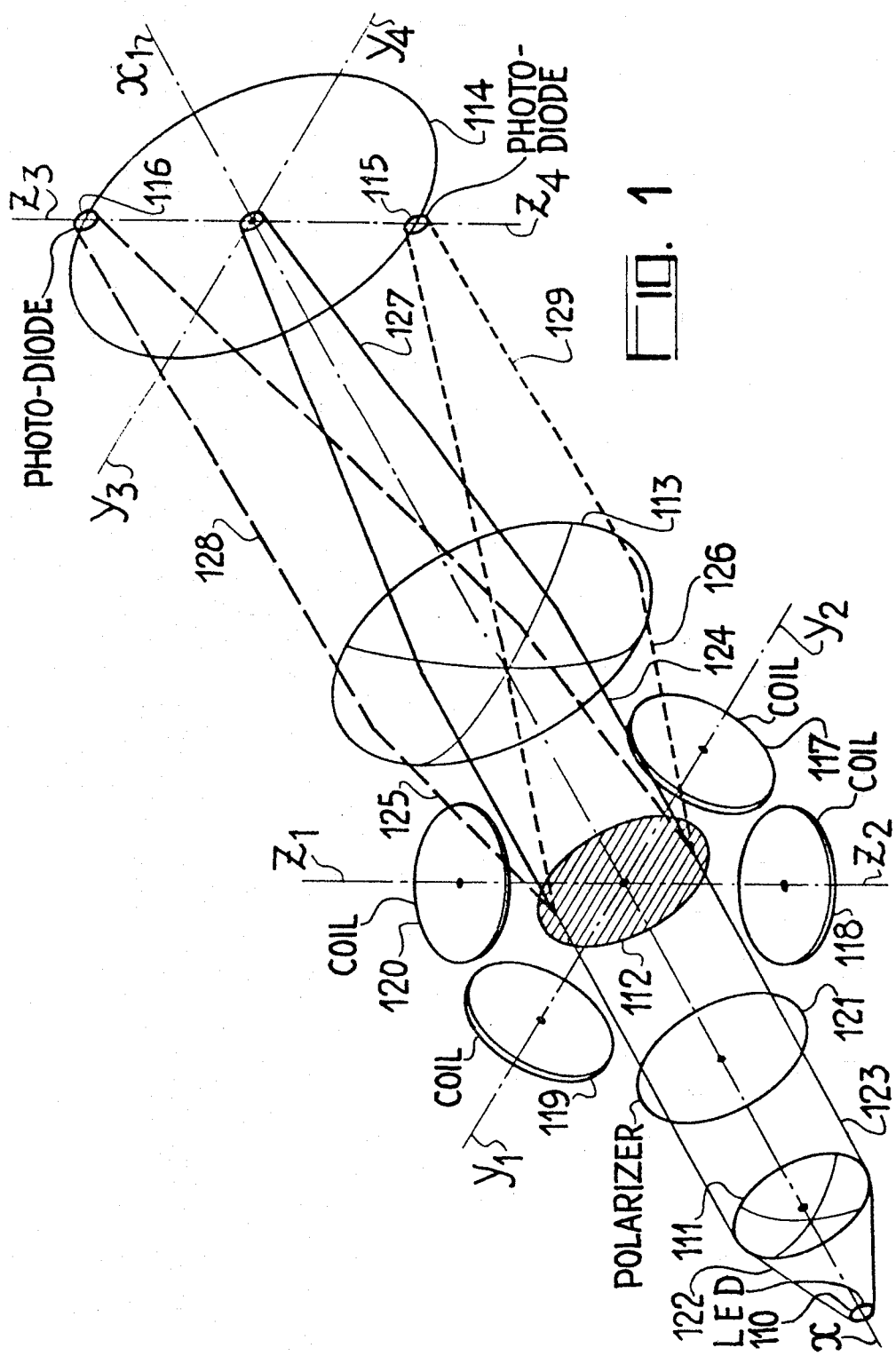

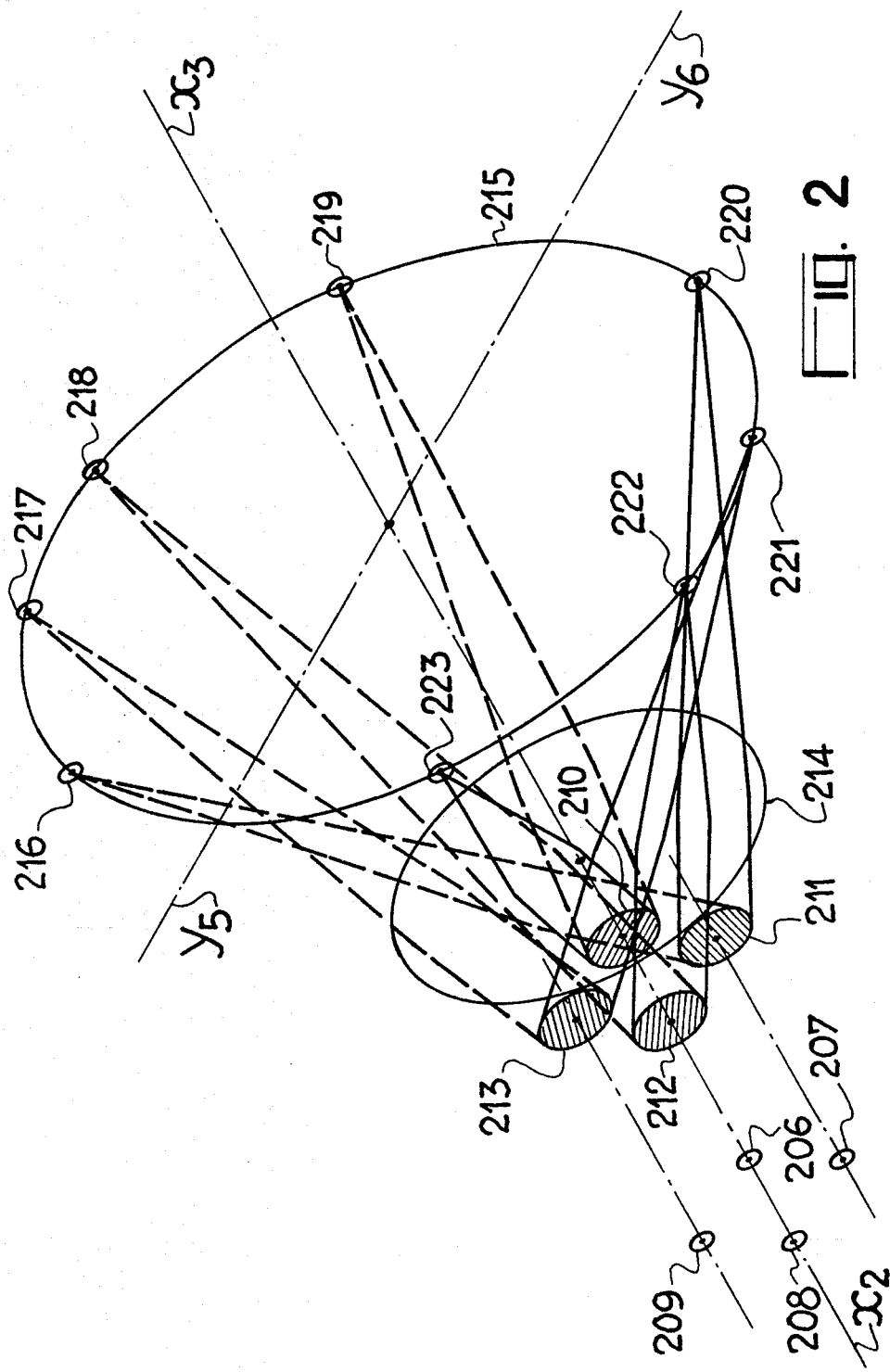

ELECTRICALLY CONTROLLED OPTICAL SWITCH

The invention relates to electrically controlled switches which enable a switchable optical connection to be established between an input phototransmitting element receiving an electrical signal and one of several output photoreceiving elements which is capable of restoring said electrical signal. By using a switch of this kind in telephonic switching, it is possible to establish a telephone exchange in which subscribers are connected without any movable electrical contacts.

It is known that a thin magnetic layer of certain materials, such as garnets, may be used as a diffraction network for an optical beam. When this layer is subjected to a magnetic field, it is divided into regions in the form of thin bands of which the magnetisation has a component perpendicular to the layer and alternating differently in direction from one band to the adjacent band. If this layer is exposed to a beam of polarised monochromatic light, the plane of polarisation of the light rotates and passes through this layer under the influence of Faraday's effect in a different direction according to the direction of said perpendicular component, i.e. alternately to the right or to the left in a band or the adjacent band. The luminous electrical field, which has passed through the layer and which has undergone the spatially alternate Faraday rotation, may be divided into two parts: the component parallel to the incident polarisation is not itself alternated and, hence, is substantially non-diffracted. By contrast, the perpendicular component alternates in direction with the periodicity of the magnetic bands, i.e. forms a "$\pi$ grating" giving odd diffraction order, in particular the $+1$ and $-1$ orders used in the present Application. One interesting consequence of this phenomenon is the fact that this diffracted light is polarised to $\pi/2$ of the incident light which enables the diffused light to be attenuated by using an extinction analyser for the incident light. We shall only be concerned hereinafter with the 0 order beam and with the 1 order beams of which the directions form with the direction of the 0 order beam an angle which is governed by the spacing of the bands. When the orientation of the bands in the plane of the thin magnetic layer is varied by varying the orientation of the magnetic control field, the plane containing these three beams is made to turn, remaining perpendicular to the direction of the bands.

Examples of embodiments such as these can be found in U.S. Pat. No. 3,752,563. These examples show in particular that, to obtain the band structure and to modify its orientation, it was necessary in the embodiments prior to the present invention to superimpose a constant magnetic field and an alternating magnetic field.

The authors of the present invention have found that, by applying an intense magnetic field to a thin layer of the kind in question, the band structure which is established under the effect of this field continues to exist following its removal and that, in order to modify the orientation of the network thus obtained, it is possible to pass through windings, which create a rotating field, current pulses which are intense for creating the necessary field, but brief for limiting the heating of these windings. No electrical energy is consumed in the interval separating two control pulses by virtue of the remanence effect mentioned above.

In accordance with the present invention it is provided an electrically controlled optical switch for optically connecting at least one electrical incoming circuit to at least one electrical output circuit, which comprises:

at least one emitting means for generating under the control of said electrical incoming circuit a parallel polarized beam;

a thin layer of magnetic material for diffracting said light beam into at least two diffracted beams;

magnetizing means for magnetizing said thin layer in accordance with a grating of thin parallel bands oriented along a controllable direction;

means for focusing said two diffracted beams on two spots situated onto a reference surface; and at least one group of photo-electric means disposed onto said reference surface and connected to said electrical output circuit; said photo-electric means being excited by at least one of said spots for a given value of said controllable direction.

For a better understanding of the invention, and to show how the same may be carried into effect, reference will be made to the ensuing description and to the attached figures among which:

FIG. 1 illustrates a diagrammatic view of an elementary one source switch;

FIG. 2 illustrates a diagrammatic view of a four-source switch.

The switch shown in FIG. 1 comprises, aligned on an axis $XX_1$, a variable-intensity light source consisting, for example, of a light-emitting diode ("LED") 110, a convergent optical system 111, a polariser 121, a thin layer of magnetic material 112, a convergent optical system 113, a group of photodetectors formed for example by photoelectric diodes distributed around the circle 114, of which only the diodes 115 and 116 have been shown, and a system for controlling the layer 112 consisting of 4 coils 117 to 120.

The light-emitting diode 110 emits a beam of monochromatic light 122. The optical system 111 converts this beam into a substantially parallel beam 123 parallel to the axis $XX_1$. This beam 123 is then polarised by the polariser 121 before arriving at the thin layer 112. This thin layer is made of a magnetic material capable of being divided up into bands. In one particular embodiment, garnet of yttrium and iron substituted by bismuth was used. The bands are formed and oriented under the action of the control system which acts in the following manner: the pair of coils 118–120 is centred on the axis $Z_1Z_2$ perpendicular to the axis $XX_1$ and to the axis $Y_1Y_2$ on which the pair of coils 117–119 is centred; the coils 118–120 create a magnetic field parallel to $Z_1Z_2$, the coils 117–119 creating a magnetic field parallel to $Y_1Y_2$, and these two fields combine to form a field parallel to the plane $Z_1Z_2Y_1Y_2$ of which the orientation is governed by the value of the constituent fields. These fields only exist at the moment when the brief current pulses are passed through the various coils. The resulting field thus created has a value of greater than 100 Oersteds in the particular case of the layer of garnet and orients the bands of the layer 112 in the required direction. The beam of polarised light is then diffracted by the layer 112 into three beams (the order greater than 1 will be disregarded in the same way as above), namely a zero order beam 124 transmitted directly parallel to the axis $XX_1$, a diffracted $+1$ order beam 125 forming an angle $+\alpha$ with the axis $XX_1$, and a $-1$ order diffracted beam 126 forming an angle $-\alpha$ with the axis $XX_1$. The axes of these beams are in a common plane containing $XX_1$ perpendicular to the direction of the bands of the layer 112. In the interests of convenience, FIG. 1 shows the bands parallel to the axis $Y_1Y_2$, so that the axes of the beams are in the plane $XX_1 - Z_1Z_2$.

The optical system 113 focuses these three beams in a plane perpendicular to the axis $XX_1$ defined by the rectangular axes $Z_3Z_4$ and $Y_3Y_4$, $Z_3Z_4$ being parallel to $Z_1Z_2$ and, hence, $Y_3Y_4$ being parallel to $Y_1Y_2$.

The 0 order focused beam 127 is not used. The +1 order focused beam 128 is concentrated upon the diode 116, whilst the −1 order focused beam 129 is concentrated upon the diode 115. These diodes 115 and 116, situated on the axis $Z_3Z_4$ and on the circle 114, form part of a plurality of diodes which are situated on the circle 114 and of which the number is determined by the number of channels to be selected within the limits permitted by the overall dimensions of the diodes and the width of the focusing spot.

When the current applied to the diode 110 is modulated, for example by a vocal frequency, a voltage with the same modulation within the limits of linearity of the elements used is collected at the terminals of the diodes 116 and 115. Accordingly, it is possible to use only one of these two diodes and hence to dispense with the other. However, it is of advantage to connect these two diodes in series in order to increase the signal-to-noise ratio.

When the orientation of the bands of the layer 112 is turned by means of the control system, the plane containing the beams 124, 125 and 126 turns about the axis $XX_1$ and the focusing spots of the beams 128 and 129 describe the circle 114. Accordingly, it is thus possible to select a connection between the diode 110 and any pair of diametrically opposite diodes on the circle 114. Due to the fact that the two −1 order and +1 order diffracted beams are always present, there is no point in making the plane containing the beams 124, 125 and 126 describe more than half a turn because, after half a turn, the same pairs of diodes as in the preceding half turn would again be selected.

Focusing of the beam 128 on the diode 116 and of the beam 129 on the diode 115 is determined solely by the orientation of the axes of the beams 125 and 126 and is not governed in particular by their position in space, provided that both the beams arrive at the optical system 113, because all the light beams of the same direction which pass through a convergent optical system pass through the secondary focal point determined by the intersection of a straight line passing through the optical center of this system and running in the same direction as the incident beams with the image focal plane. The result of this in particular is that, if the complex consisting of the diode 110, the optical system 111, the polariser 121, the thin layer 112 and the control system 117 to 120 is displaced so that the axis of this complex remains parallel to $XX_1$ whilst the beams diffracted by the layer 112 always pass through the optical system 113, the optical system 113 and the diodes distributed on the circle 114 remaining fixed, the beams 128 and 129 will always be focused on the diodes 116 and 115 (which is the case with the FIG. 1 where the orientation of the bands is as described, although the same applies to any other orientation of the bands).

Accordingly, it is possible to place side by side several of the complexes thus displaceable to form a multichannel switch of the type described hereinafter.

The switch shown in FIG. 2 comprises 4 complexes similar to those shown in FIG. 1, each consisting of a diode, a convergent optical system, a polariser and a thin layer associated with a control system. In the interests of clarity, the FIG. 2 only shows the 4 diodes 206 to 209 and the 4 thin layers 210 to 213. The limitation to 4 complexes is a particular case which has also been selected in the interests of clarity of the drawing. The axes of these 4 complexes are parallel to the axes $X_2X_3$ on which are aligned a convergent optical system 214 and a circle 215 on which is distributed a group of photoelectric diodes of which only the diodes 216 to 223 are shown.

The diode 206 emits a light beam (not shown in the FIG. 2). After having passed through the optical system and the polariser corresponding to this diode, the light beam is diffracted by the layer 210. Light beams of different diffraction orders emerge from the layer 210, the FIG. 2 only showing the +1 order and −1 order beams which are the only beams to be used. The optical system 214 focuses these beams on the diodes 219 and 223. In the interests of clarity of the drawing, the focusing point is shown as a dot although, in reality, it is in the form of a spot.

An optical connection between the emitting diode 206 and the receiving diodes 219 and 223 has thus been established in the same way as in the switch illustrated in FIG. 1.

The operation is the same for the other three complexes corresponding to the diodes 207 to 209 and to the layers 211 to 213. Optical connections are thus established between the diode 207 and the diodes 216 and 220 by way of the layer 211, between the diode 208 and the diodes 218 and 222 by way of the layer 212 and between the diode 209 and the diodes 217 and 221 by way of the layer 213.

When the orientation of the bands of the layers 210 to 213 is made to turn, the focusing spots of the diffracted beams describe the circle 215 and it is thus possible to establish an optical connection between each of the emitting diodes 206 to 209 and any pair of diametrically opposite diodes of the complex of receiving diodes situated on the circle 215. It is also generally necessary to prevent the beams issuing from two or more diodes from terminating at the same pair of receiving diodes because the signals emitted would be mixed on reception. To this end, the apparatus which processes the signals transmitted to the systems for controlling the orientation of the bands of the layers comprises means for preventing the same orientation from being given to more than one layer. This result could be achieved for example by simple logic circuits.

In the same way as in the switch shown in FIG. 1, it is possible, for each of the groups of two diametrically opposite diodes, to use only one of them, although it is also of advantage to add the two available signals.

It is readily possible to construct a switch of the same type, but comprising a much larger number of emitting diodes associated with arrangements for deflecting the light beams. It is sufficient for the optical focusing system 214 to be large enough to collect all the diffracted beams.

Switches of this kind may be used with particular advantage in automatic telephone exchanges. It has been shown to be possible by means of these switches to establish connections for unilaterally transmitting modulations between the circuits feeding the emitting diodes and the circuits fed by the receiving diodes. If a switch of this kind comprises $n$ incoming circuits and $m$ outgoing circuits, it enables a maximum number of connections equal to the smallest of the numbers $n$ and $m$ to be established. It is of no real advantage for $n$ to be greater than $m$ because, in that case, it is inevitable that some of the deflectors will remain unused when all the output circuits are selected. Now these deflectors are the most delicate and most onerous part of the equipment and it is advisable to use them to the full. Maximum utilisation is obtained when $n = m$.

The element of automatic telephone exchanges known as a "crossbar switch" enables $n$ connections to be established between $n$ incoming circuits and $n$ outgoing circuits among $m$. However, these connections are bilateral and, in most cases, each of them permits the passage of $k$ circuits which means than $n$ groups of $k$ incoming circuits are addressed for $n$ groups of $k$ outgoing circuits among $m$-groups of $k$. By associating a certain number of switches according to the invention (i.e. two at least for ensuring that the connections are bilateral), it is possible to perform the same function as a "crossbar switch" of the kind referred to above. It is also possible to divide this function into more elementary functions and to use the magneto-optical switch as a single element at the architecture level of the exchange.

Another, older element of telephone exchanges known as a selector enables one connection to be established between one incoming circuit and one outgoing circuit among $m$. This connection is also bilateral and generally permits the passage of $k$ circuits. For performing this function with an electro-optical switch, the particular case where $n = 1$ is used, i.e. the switch illustrated in FIG. 1.

It is possible to construct switches allowing two-way connections. The principle of inverse return of light is used for this purpose, the role of the diodes being reversed, i.e. the emitting diodes becoming receiving diodes and conversely. By separating the beams either by means of semi-transparent mirrors or by a slight separation of the image focal points and object focal points, it is possible to have one pair of emitting and receiving diodes at each end of the connection.

In another variant of these switches, the magnetic layers operate by reflection rather than by transmission, for example by being coated with a powder known as bitter powder.

What we claim is:

1. An electrically controlled optical switch for optically connecting at least one electrical incoming circuit to at least one electrical output circuit, which comprises:
    at least one emitting means for generating under the control of said electrical incoming circuit a parallel polarized light beam;
    a thin layer of transparent magnetic material exhibiting a magnetic remanence effect for diffracting by transmission said light beam into at least two diffracted beams;
    means for magnetizing said thin layer in accordance with a grating of thin parallel bands oriented along a controllable direction; said magnetizing means being designed for acting under the control of short strong electrical current pulses, and said controllable direction being constant between two of said pulses without an applied bias magnetic field because of said remanence effect;
    means for focusing said two diffracted beams on two spots situated onto a reference surface; and
    at least one group of photo-electric means disposed onto said reference surface and connected to said electrical output circuit; said photo-electric means being excited by at least one of said spots for a given value of said controllable direction.

2. A switch as claimed in claim 1, wherein said emitting means are single.

3. A switch as claimed in claim 1, which comprises a plurality of $n$ of said emitting means and a plurality of $m$ groups of said photo-electric means; $n$ being equal to $m$.

4. A switch as claimed in claim 1, wherein said group of photo-electric means comprises two cells respectively excited by said two diffracted beams, said two cells connected in series.

5. A switch as claimed in claim 1, further comprising a receiving means associated and located with said emitting means and an other emitting means associated and located with said group of photo-electric means, for optically connecting an other electrical incoming circuit with an other electrical output circuit, in a reverse manner as said one electrical incoming circuit is connected to said one electrical output circuit.

* * * * *